(12) United States Patent
Hamaguchi et al.

(10) Patent No.: US 6,404,085 B2
(45) Date of Patent: *Jun. 11, 2002

(54) VIBRATION GENERATOR FOR REPORTING AND PORTABLE COMMUNICATION EQUIPMENT USING THE SAME

(75) Inventors: Toshihide Hamaguchi, Higashiosaka; Kouichi Kawakami, Nara, both of (JP)

(73) Assignee: Sanyo Electric Co., LTD, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/202,663
(22) PCT Filed: Jun. 20, 1997
(86) PCT No.: PCT/JP97/02147
§ 371 (c)(1),
(2), (4) Date: Dec. 18, 1998
(87) PCT Pub. No.: WO97/48502
PCT Pub. Date: Dec. 24, 1997

(30) Foreign Application Priority Data

Jun. 21, 1996 (JP) ............................................. 8-161399
Sep. 19, 1996 (JP) ............................................. 8-248156

(51) Int. Cl.⁷ ............................ H02K 33/18; B06B 1/04
(52) U.S. Cl. ....................... 310/81; 340/311.1; 381/396
(58) Field of Search ............................. 310/81, 29, 21, 310/32, 15, 23, 30; 340/388.1, 311.1; 381/396, 151, FOR 152, 414

(56) References Cited

U.S. PATENT DOCUMENTS 4,169,234 A * 9/1979 Yonkers ...................... 310/29
4,312,118 A * 1/1982 Saik et al. .................... 29/594
4,352,091 A    9/1982 Yamasaki ................. 340/311.1

(List continued on next page.)

FOREIGN PATENT DOCUMENTS

| JP | 59094997 | 5/1984 |
| JP | 2-105640 | 4/1990 |
| JP | 5-48447 | 6/1993 |
| JP | 5-85192 | 11/1993 |
| JP | 06120866 | 4/1994 |
| JP | 07057159 | 3/1995 |
| JP | 07140984 | 6/1995 |
| JP | 7-273843 | 10/1995 |

OTHER PUBLICATIONS

Patent Abstract of Japan, vol. 1997, No. 07, Jul. 31, 1997, and JP 09 070571 A (Matsushita Electric Ind Co Ltd), Mar. 18, 1997 *abstract*.

Patent Abstracts of Japan, vol. 018, No. 406 (E–1585), Jul. 28, 1994 and JP 06 120866 A (Copal Co LTD), Apr. 28, 1994 *abstract*.

Pinder, E A et al: "Integration of Tactile Annunciator and External Microphone" Motorola Technical Developments, Motorola Inc. Schaumburg, Illinois, US, vol. 24, Mar. 1, 1995, pp. 30–31, XP000500325 *the whole document*.

Primary Examiner—Karl Tamai
(74) Attorney, Agent, or Firm—Armstrong, Westerman & Hattori, LLP

(57) ABSTRACT

A vibration generator comprises a first vibrator having a permanent magnet and supported by a first spring body on a fixing member, and a second vibrator having a coil so disposed as to intersect the magnetic flux of the permanent magnet and supported by a second spring body on the fixing member. One of the first vibration system and the second vibration system serves as a sound source for producing sound waves of audio-frequency for propagation to the outside, and the other vibration system serves as a vibration source for transmitting vibration to the fixing member and vibrating a device.

5 Claims, 8 Drawing Sheets

U.S. PATENT DOCUMENTS

| | | | |
|---|---|---|---|
| 4,635,287 A | * | 1/1987 | Hirano .................... 381/194 |
| 4,931,765 A | * | 6/1990 | Rollins et al. .............. 340/407 |
| 5,107,540 A | * | 4/1992 | Mooney et al. ............ 381/192 |
| 5,172,092 A | | 12/1992 | Nguyen et al. .......... 340/311.1 |
| 5,379,032 A | * | 1/1995 | Foster et al. ........... 340/825.46 |
| 5,528,697 A | * | 6/1996 | Saito ........................ 381/192 |
| 5,682,132 A | * | 10/1997 | Hiroyoshi et al. ....... 340/407.1 |
| 5,786,741 A | * | 7/1998 | Leibzon ..................... 335/222 |
| 5,861,686 A | * | 1/1999 | Lee ............................ 310/36 |
| 5,894,263 A | * | 4/1999 | Shimakawa et al. ..... 340/388.1 |
| 5,896,076 A | * | 4/1999 | Van Namen ............... 335/229 |
| 5,903,076 A | * | 5/1999 | Suyama ...................... 310/81 |
| 6,281,785 B1 | * | 8/2001 | Hamaguchi ............. 340/407.1 |

* cited by examiner

VIBRATION GENERATOR FOR REPORTING AND PORTABLE COMMUNICATION EQUIPMENT USING THE SAME

TECHNICAL FIELD

The present invention relates to a notifying vibration generator for use in portable communications devices, such as portable telephones and pagers, or in small-sized devices, such as wristwatches and toys, and also to portable communications devices wherein the generator is used.

BACKGROUND ART

Small-sized devices, such as portable communications devices, are equipped with means for notifying the user, for example, of incoming calls or specified hours. The notifying means most widely used is a bell, or like means, for producing a sound. However, in view of a nuisance to people in the surroundings, more widely used in recent years are small devices which have incorporated therein not only notifying means resorting to sound but also means for vibrating the device for notification so as to use both the notifying means or selectively use one of them in accordance with the situation.

The sound generators conventionally in wide use include a ringer 100 shown in FIGS. 9, (*a*) and (*b*). The ringer comprises a magnetic circuit portion composed of a permanent magnet 101 and a yoke 102 and fixedly housed in a case 104. A coil 103 is fixed to the yoke 102, and a diaphragm is disposed as opposed to the yoke 102. The diaphragm 105 is secured at its peripheral edge to the case 104, A lid 106 having an opening is fixed to the case 104.

When current is passed through the coil 103, the yoke 102 is electrically magnetized, forming a magnetic pole at its top end. The magnetic pole on the yoke 102 and the magnetic pole on the diaphragm 105 cause the diaphragm 105 to be attracted to the yoke 102 if the poles are different or to be repelled by the yoke 102 if the poles are the same. When the current is passed through the coil 103 intermittently, therefore, the diaphragm 105 performs this movement repeatedly, vibrating air to produce sound waves, which propagate to the outside through the opening of the lid 106. Notice can be given with sound by setting the diaphragm 105 at an audio-frequency (about 20 Hz to about 20 kHz).

The vibration generator most widely used heretofore is a cylindrical dc motor 200 provided with an eccentric weight 202 on its rotary shaft 201 as seen in FIG. 10. When the motor 200 is energized, the eccentric weight 202 rotates with the shaft 201, generating vibration, which is transmitted to a device to realize notification with the vibration.

With the device incorporating both the means for notifying with sound and means for notifying with vibration, it is conventionally necessary to arrange the two means, i.e., the sound generator and the vibration generator, as described above. FIG. 11 shows such a portable communications device of the prior art. The drawing shows a portable telephone body 300, antenna 301, speaker 302 for incoming speech, microphone 303 for outgoing speech, display 304 and push buttons 305. The telephone body 300 has the above-mentioned ringer 100 for giving notice of incoming calls with sound, and the cylindrical dc motor 200 for giving notice of incoming calls with vibration. The prior art thus requires two separate notifying means, i.e., means resorting to sound and means using vibration, and accordingly has the problem that it is difficult to compact the device. Thus, the device requires a greater interior space than when single notifying means only is used.

SUMMARY OF THE INVENTION

An object of the present invention is to provide a notifying vibration generator having both the function of generating sound and the function of generating vibration, and to provide a compacted portable communications device by using the vibration generator.

The present invention provides a notifying vibration generator which comprises a first vibrator having a permanent magnet and supported by a first spring body on a fixing member, a second vibrator having a coil so disposed as to intersect the magnetic flux of the permanent magnet and supported by a second spring body on the fixing member, and a power supply connected to the coil for passing current of predetermined frequency through the coil. One of a first vibration system provided by the first vibrator and the first spring body and a second vibration system provided by the second vibrator and the second spring body is used as a sound source for producing sound waves of audio-frequency for propagation to the outside, and the other vibration system serves as a vibration source for transmitting vibration to the fixing member and vibrating a device.

When the coil is energized by the power supply, an interaction of the current and magnetic field produces an electromagnetic force acting between the first vibrator having the permanent magnet and the second vibrator having the coil. Accordingly, when current of periodically varying values is passed through the coil, each of the first vibration system and the second vibration system is subjected periodically to the electromagnetic force to undergo forced vibration. By virtue of the forced vibration, the vibration system serving as the sound source produces sound waves of audio-frequency, propagating the waves to the outside, and the vibration system serving as the vibration source transmits the vibration to the fixing member to vibrate a device.

The invention provides as another feature thereof a portable communications device characterized in that the device comprises a vibration generator having a first vibrator having a first natural frequency, a second vibrator having a second natural frequency, and a magnetic circuit composed of a coil and a permanent magnet for driving the first and second vibrators; first and second signal generating means for producing signals with frequencies in match with the first and second natural frequencies respectively; switch means for selecting one of the signals to be produced by the first and second signal generating means and feeding the selected signal to the vibration generator; means for detecting incoming calls; and switch means for controlling the switch means according to selection by the user upon the detecting means detecting an incoming call.

Thus, when an incoming call is detected by the call detecting means, the user is notified of the incoming call with vibration or released sound as selected by the user in advance.

BEST MODE OF CARRYING OUT THE INVENTION

Figure 1A:
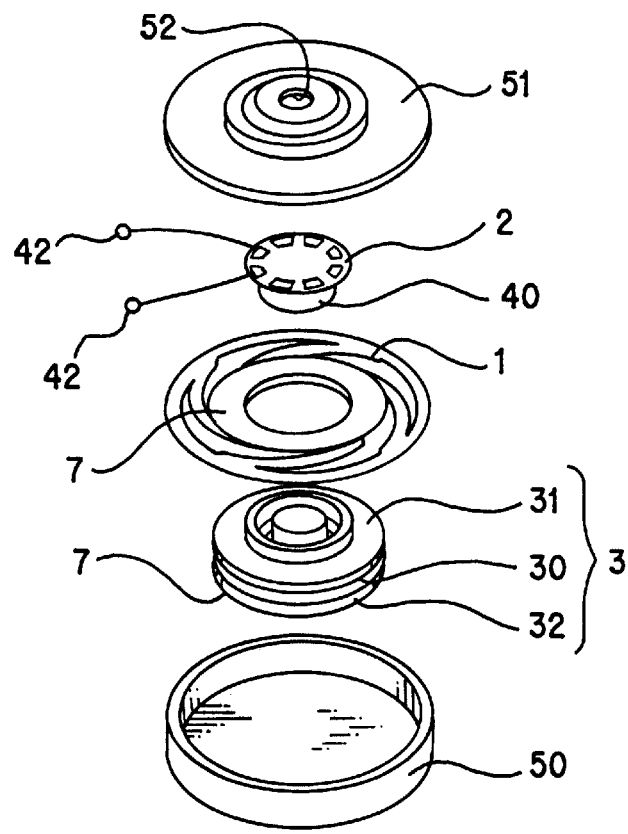
FIGS. 1(*a*) and 1(*b*) are exploded and sectional views respectively showing a notifying vibration generator according to the invention.
Figure 1B:
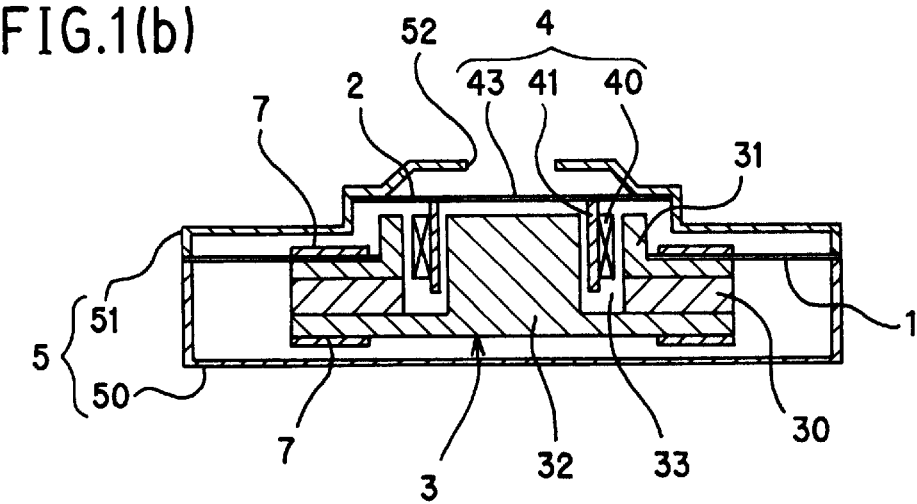

Embodiments of the invention will be described below with reference to the drawings. FIGS. 1, (a) and (b) show a notifying vibration generator embodying the invention. The vibration generator comprises two vibration systems, and a fixing member 5 for supporting the vibration systems. According to the present embodiment, the fixing member 5 comprises a lower case 50 for supporting the first of the vibration systems, and an upper case 51 supporting the second vibration system and joined to the lower case 50. The lower case 50 and the upper case 51, when joined, define an interior space for accommodating the two vibration systems. The upper case 51 is centrally formed with an opening 52 for propagating sound waves to the outside.

The first vibration system comprises a first spring body 1 made of an elastic material, such as a thin metal plate, rubber or resin, and deformable perpendicular to the plane thereof, and a first vibrator 3 comprising a permanent magnet 30. As shown in FIG. 1(a), the first spring body 1 is disc-shaped and possesses a plurality of circumferentially shaped spirally-curved slits extending from locations adjacent the outer peripheral portion toward the central portion. The first vibrator 3 is attached to the first spring body 1 toward the inner periphery thereof as by bonding, and the first spring body 1 is attached at its outer periphery to the lower case 50 as by bonding, whereby the first vibration system is adapted to vibrate upward and downward relative to the lower case 50.

An upper yoke 31 and a lower yoke 32 are arranged respectively on and beneath the permanent magnet 30 providing the first vibrator 3 to prevent the magnetic field from leaking to the outside and to efficiently produce an electromagnetic force by the interaction of the current and the magnetic field, whereby a magnetic circuit is formed. The magnet 30 is annular and has an N pole on its upper surface and an S pole on its lower surface. The upper yoke 31 is in the form of a ring having a vertical wall along the inner periphery thereof and defining a body of L-shaped cross-section. The lower yoke 32 is in the form of a disk having a central protrusion. A magnetic gap 33 is formed inside the vertical wall of the upper yoke 31 around the central protrusion of the lower yoke 32 for permitting upward and downward movement of the second vibrator 4 to be described below.

On the other hand, the second vibration system comprises a second spring body 2 made of the same elastic material as the first spring body 1 and deformable perpendicular to the plane thereof, and a second vibrator 4 comprising a coil 40.

The second vibrator 4 is positioned radially inwardly of the second spring body 2 and attached thereto as by bonding, and the second spring body 2 is attached at its outer periphery to the upper case 51 as by bonding, whereby the second vibrator 4 is adapted to vibrate upward and downward relative to the upper case 51.

The second vibrator 4 comprises the coil 40, a bobbin 41 supporting the coil 40, and a diaphragm 43 for producing sound waves. The bobbin 41 is a hollow cylinder in shape and is attached to the second spring body 2. The coil 40 is provided around the bobbin 41. The diaphragm 43 is disposed on the upper end of the bobbin 41. The coil 40 and the bobbin 41 are arranged in the magnetic gap 33 of the first vibrator 3 movably.

The lower case 50 and the upper case 51 provided with the respective vibration systems are joined as described above, and terminals 42, 42 of the coil 40 are electrically connected to a power supply 6 (not shown in FIG. 1) for passing electric current of predetermined frequency through the coil 40.

Figure 2A:
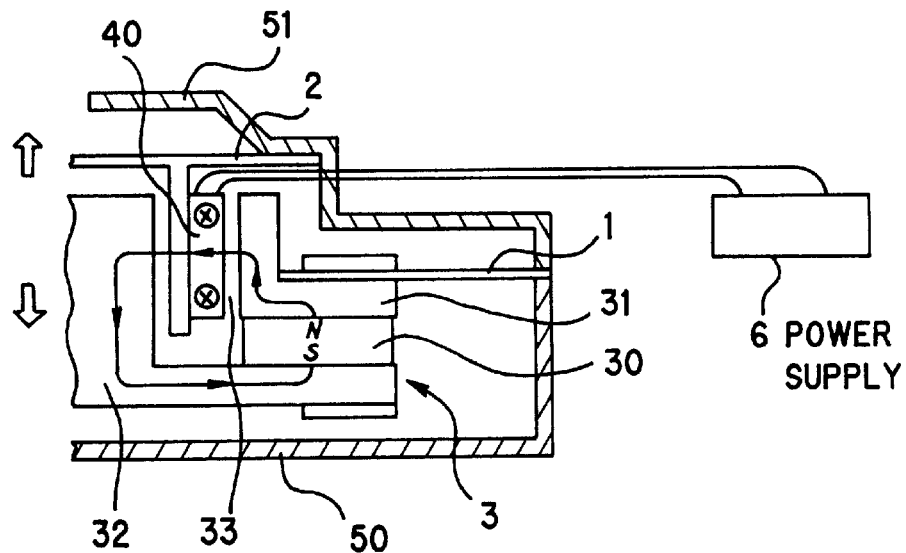
FIGS. 2(*a*) and 2(*b*) are diagrams illustrating the operation of the notifying vibration generator.
Figure 2B:
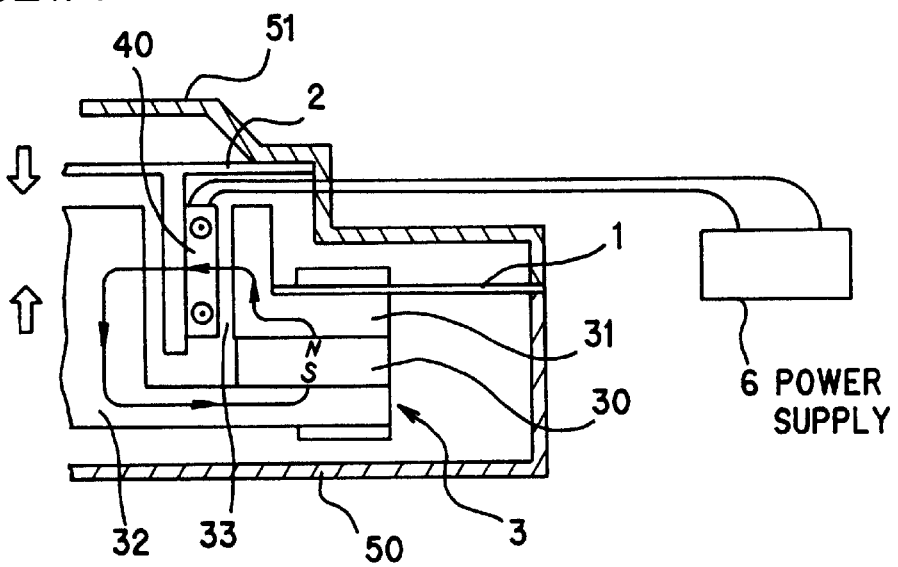

Formed in the first vibrator 3 at this time is a magnetic circuit directed as indicated by arrows in FIGS. 2, (a) and (b) and including the permanent magnet 30, upper yoke 31, lower yoke 32 and magnetic gap 33. The magnetic field in the gap 33 is directed radially inwardly thereof. Assuming that the current through the coil 40 is counterclockwise when the vibrator is seen from above, an interaction between the magnetic field and the current intersecting the field produces repulsion between the first vibrator 3 and the second vibrator 4 as shown in FIG. 2, (a). Conversely, if the direction of current through the coil 40 is reversed, attraction acts between the first vibrator 3 and the second vibrator 4 as shown in FIG. 2, (b).

Accordingly, each of the first and second vibrators 3 and 4 is subjected to a periodic electromagnetic force as an external force by periodically varying the value of current to be passed through the coil 40. Thus, each of the first vibration system and the second vibration system can be caused to generate forced vibration by the combination of the permanent magnet 30 and the coil 40. By virtue of the forced vibration, the first vibration system causes the first vibrator 3 to collide with the cases 50, 51 or the restoring force of the first spring body 1 to transmit the vibration to the cases 50, 51, vibrating the device and realizing notification with the vibration. With the second vibration system, the forced vibration causes the diaphragm 43 of the second vibrator 4 to vibrate the air to produce sound waves, which propagate to the outside through the opening 52 in the upper case 51. If the sound waves have an audio-frequency (about 20 Hz to about 20 kHz), notification with the sound can be realized.

For a vibration system to function effectively as a sound source, it is desirable to cause the system to vibrate as greatly as possible at a frequency of 2 to 3 kHz to which the human has the highest auditory sensitivity. Vibration generators conventionally used as vibration sources for devices are generally about 100 Hz in frequency. Accordingly, for a certain vibration system to serve effectively as the vibration source, it is desirable to cause the system to vibrate as greatly as possible at a frequency of about 100 Hz.

The two vibration systems of the present embodiment are each single-degree-of-freedom systems. When the coefficient of viscosity is neglected because it is very small, with the mass of the spring body also neglected because it is much smaller than the mass of the vibrator, the natural frequency f0 of each system is expressed by:

$$f0=(1/2\pi)(k/m)^{1/2}$$

wherein $\pi$ is the ratio of the circumference of a circle to its diameter, k is the spring constant of the spring body and m is the mass of the vibrator. Accordingly, the desired natural frequency of each vibration system can be obtained by suitably determining the spring constant of the spring body of the system and the mass of the vibrator thereof.

Suppose the natural frequency f02 of the second vibration system is 3 kHz, the natural frequency f01 of the first vibration system is 100 Hz and the first vibrator 3 and the second vibrator 4 are approximately equal in mass. A description will then be given of the relationship between the frequency of the current through the coil 40 and the amplitude of each of the first and second vibrators 3 and 4.

Figure 3:
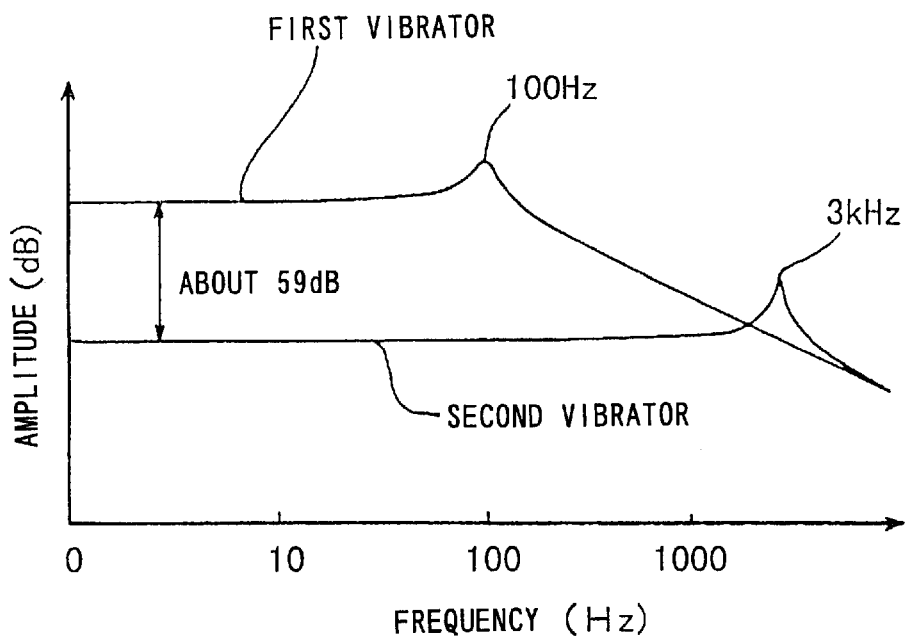
FIG. 3 is a graph showing the amplitude characteristics of vibrators relative to the frequency of current through a coil of the vibration generator of the invention.

When the vibrator is subjected to a periodic external force due to the current and the magnetic field in the single-degree-of-freedom vibrating system, and if the inductance of the coil is neglected, the amplitude G of the vibrator is expressed by:

$$|G|=(KBL)/\{r^2(k-m\omega^2)^2+K^4B^4L^4\omega^2\}^{1/2}$$

wherein K is a proportional constant, B is the magnetic flux density in the magnetic gap 33, L is the effective length of the coil 40, r is the dc resistance of the coil 40, and $\omega$ is the angular frequency (=$2\pi f$) of the current through the coil 40. FIG. 3 is a graph showing the relationship between the amplitude of the vibrator and the current frequency at this time.

Referring to FIG. 3, when the current frequency is up to about 100 Hz, the amplitude of the first vibrator 3 is by far greater than that of the second vibrator 4, and the difference is about 59 dB. The first vibrator 3 exhibits the greatest amplitude when the current frequency is about 100 Hz. As the frequency increases beyond about 100 Hz, the amplitude of the first vibrator 3 decreases exponentially. On the other hand, the amplitude of the second vibrator 4 increases as the frequency increases to about 3 kHz, and is greatest and greater than that of the first vibrator 3 at about 3 kHz. As the frequency increases beyond about 3 kHz, the amplitude of the second vibrator 4, like that of the first vibrator 3, decreases exponentially.

Accordingly, the power supply 6 has connected thereto a change-over circuit for changing the frequency of the current to be passed through the coil 40 by the power supply 6 to the natural frequency of the first vibration system, i.e., $f_{01}$=100 Hz, or to the natural frequency of the second vibration system, i.e., $f_{02}$=3 kHz. When the frequency of the current to be passed through the coil 40 by the power supply 6 is changed to about 100 Hz by the change-over circuit, the first vibrator 3 vibrates more greatly than the second vibrator 4 to realize notification solely by the vibration of the device. Alternatively if the frequency of the current to be passed through the coil 40 by the power supply 6 is changed to about 3 kHz by the change-over circuit, the second vibrator 4 vibrates more greatly than the first vibrator 3, whereby notification with sound only can be realized.

To prevent the first vibrator 3 and the cases 50, 51 from breaking due to the striking contact in the case where the first vibrator 3 collides with the cases 50, 51 for the transmission of vibration, it is desired to provide a cushion 7 of rubber or the like on each of the colliding portions of the first vibrator 3 as shown in FIGS. 1, (a) and (b). Such cushions 7 may be provided on the colliding portions of the cases 50, 51.

The embodiment described above is intended to illustrate the present invention and should not be construed as limiting the invention set forth in the appended claims or reducing the scope thereof. The vibration generator of the invention is not limited to the foregoing embodiment in construction but can of course be modified variously within the technical scope as defined in the claims.

For example, the components are circular in shape, and the second vibrator 4 is positioned above the first vibrator 3 according to the embodiment described, whereas the shapes and positions of the components can be selected as desired insofar as the magnetic field of the permanent magnet 30 and the current through the coil 40 produce an electromagnetic force acting in such a direction as to vibrate the first and second vibrators 3, 4. Similarly, it is possible to dispose on the first vibration system a diaphragm for producing sound waves to provide a sound source, and for the second vibration system to serve as a vibration source for transmitting vibration to the device by way of the cases 50, 51. It is desired that the opening 52 formed in the case 50 or 51 be positioned close to the sound source. The mass and the spring constant of each vibration system can be determined optionally insofar as the vibration of the device or the sound is perceivable by the user.

The current to be provided by the power supply 6 preferably has an ac waveform such that the direction of the current changes periodically as shown in FIGS. 2, (a) and (b). However, a body can be forcibly vibrated by applying thereto an external force periodically varying in magnitude. Accordingly, insofar as the current to be passed through the coil 40 has a constant frequency, the average current value during one cycle need not be zero like the ac waveform. The current can be of an optional periodically altering waveform like that of sine waves or triangular waves.

The vibration systems, although accommodated in the cases 50, 51 according to the present embodiment, can be installed directly in the device. More specifically, the fixing member 5 can be the device itself or any desired member insofar as the member can be fixed to the device.

The notifying vibration generator as applied to portable communications devices will be described next with reference to the following embodiments.

Figure 4:
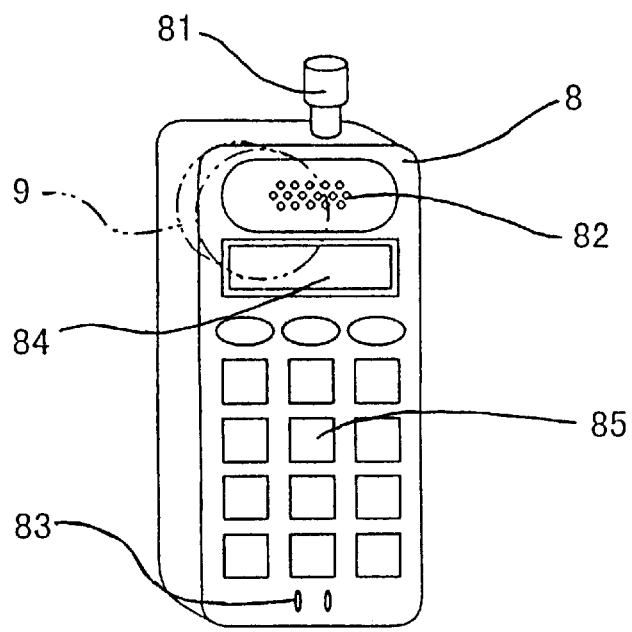
FIG. 4 is a view of a first embodiment comprising the vibration generator of the invention as used in a portable communications device.

FIG. 4 shows the first of these embodiments wherein the notifying vibration generator described is applied to a portable telephone device. The drawing shows the body 8 of a portable telephone, an antenna 81, a speaker 82 for incoming speech, a microphone 83 for outgoing speech, a display 84 and bush buttons 85. The telephone body 8 has incorporated therein a notifying vibration generator 9 like the foregoing embodiment.

Figure 5:
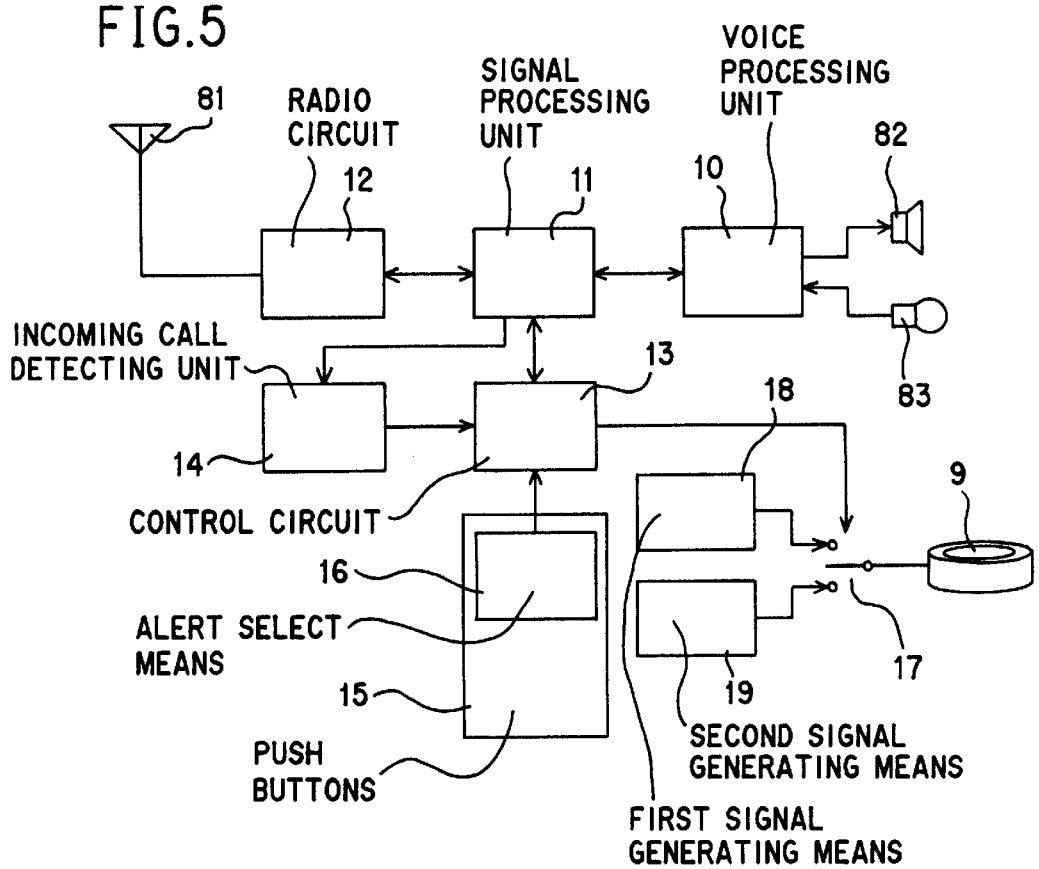
FIG. 5 is a block diagram of the first embodiment shown in FIG. 4.

FIG. 5 is a block diagram of the first embodiment. An analog voice signal input through the microphone 83 is converted by a voice processing circuit 10 into a digital voice signal, which is then processed by a signal processing circuit 11, fed to a radio circuit 12 for frequency conversion and modulation and transmitted from the antenna 81 as a specified output. On the other hand, a signal received by the antenna 81 is frequency-converted and demodulated in the radio circuit 12 and fed to the signal processing circuit 11, which delivers a digital voice signal. The signal is converted to an analog voice signal in the voice signal processing circuit 10, and the speaker 82 delivers an output. Indicated at 13 is a control circuit for controlling the overall device.

Indicated at 14 is a circuit for detecting an incoming call. At all times, the portable telephone intermittently receives radio waves transmitted from the public base station, and detects an incoming call, if any, by the incoming call detecting circuit 14 from the control signal processed in the signal processing circuit 11. Indicated at 16 is alert select means for selecting sound or vibration for use in notifying the user of the incoming call. This means 16 is provided by one of the push buttons 15, or by pressing some of the buttons 15 in combination. The manipulation of the alert select means 16 is transmitted to the control circuit 13, which changes over switch means 17 upon the circuit 14 detecting the incoming call. Indicated at 18 and 19 are first and second signal generating means, respectively, for producing the signals to be applied to the notifying vibration generator 9.

Figure 6A:
FIGS. 6(a) and 6(b) are diagrams showing signals for use in the vibration generator.
Figure 6B:
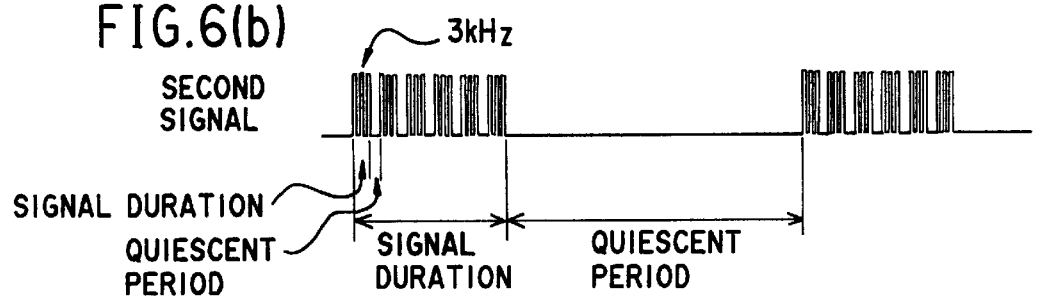

FIG. 6 includes diagrams showing examples of first signal and second signal. The first signal is in the form of 100-Hz rectangular waves as shown in FIG. 6, (a), and has a frequency equal to the natural frequency of the first vibrator (3 in FIG. 1) of the vibration generator 9. The generator 9 can be vibrated by feeding the first signal thereto. As shown in FIG. 6, (b), the second signal has a signal duration in which 3-kHz signal is produced and a quiescent period in which no signal is generated. When applied to the vibration generator 9, the second signal vibrates the second vibrator (4 in FIG. 1) of the generator 9 to produce a sound. A desired ringer sound can be produced at this time by setting the signal duration and the quiescent period at suitable values.

As specified by the user with the alert select means 16, the first or second signal generating means 18 or 19 is connected to the vibration generator 9 under the control of the control circuit 13 on receiving an incoming call, notifying the user of the call with the vibration or sound.

Figure 7:
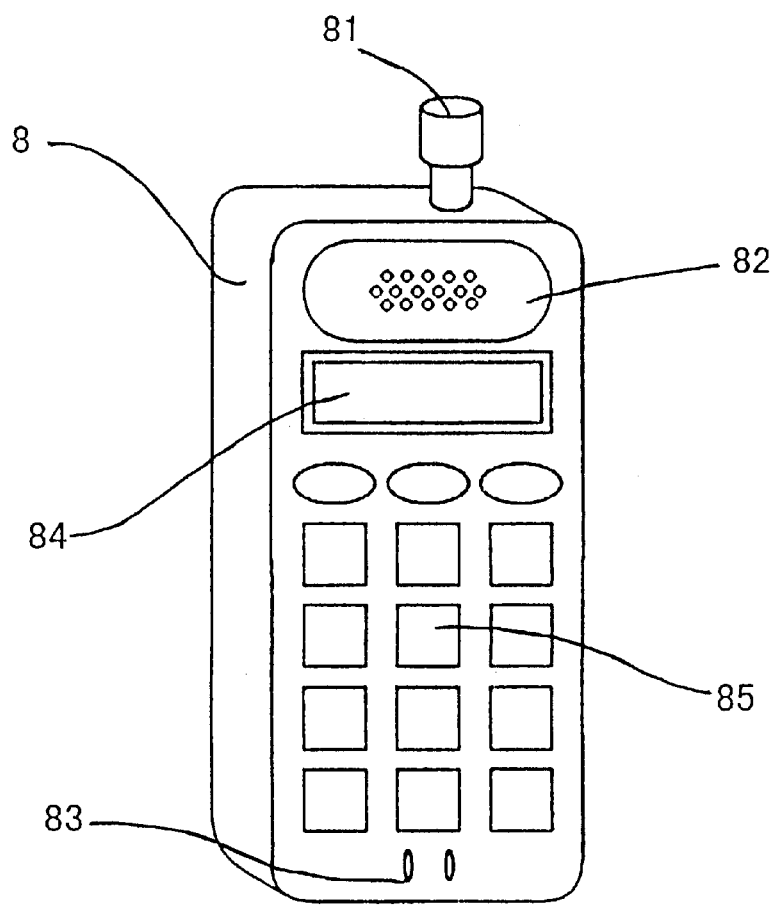
FIG. 7 is a view of a second embodiment comprising the vibration generator of the invention as used in a portable communications device.
Figure 7:
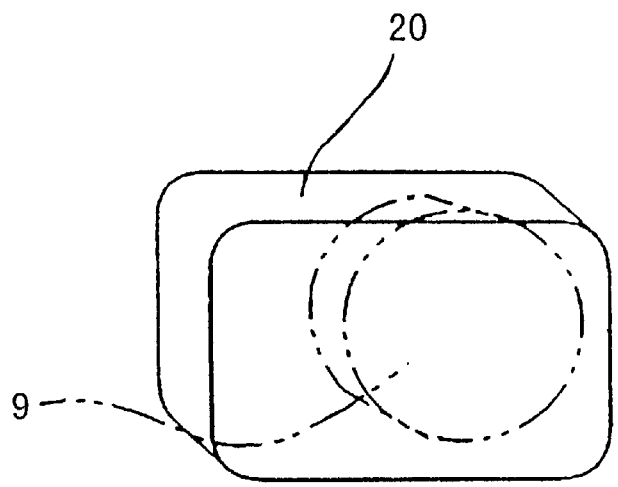
Figure 8:
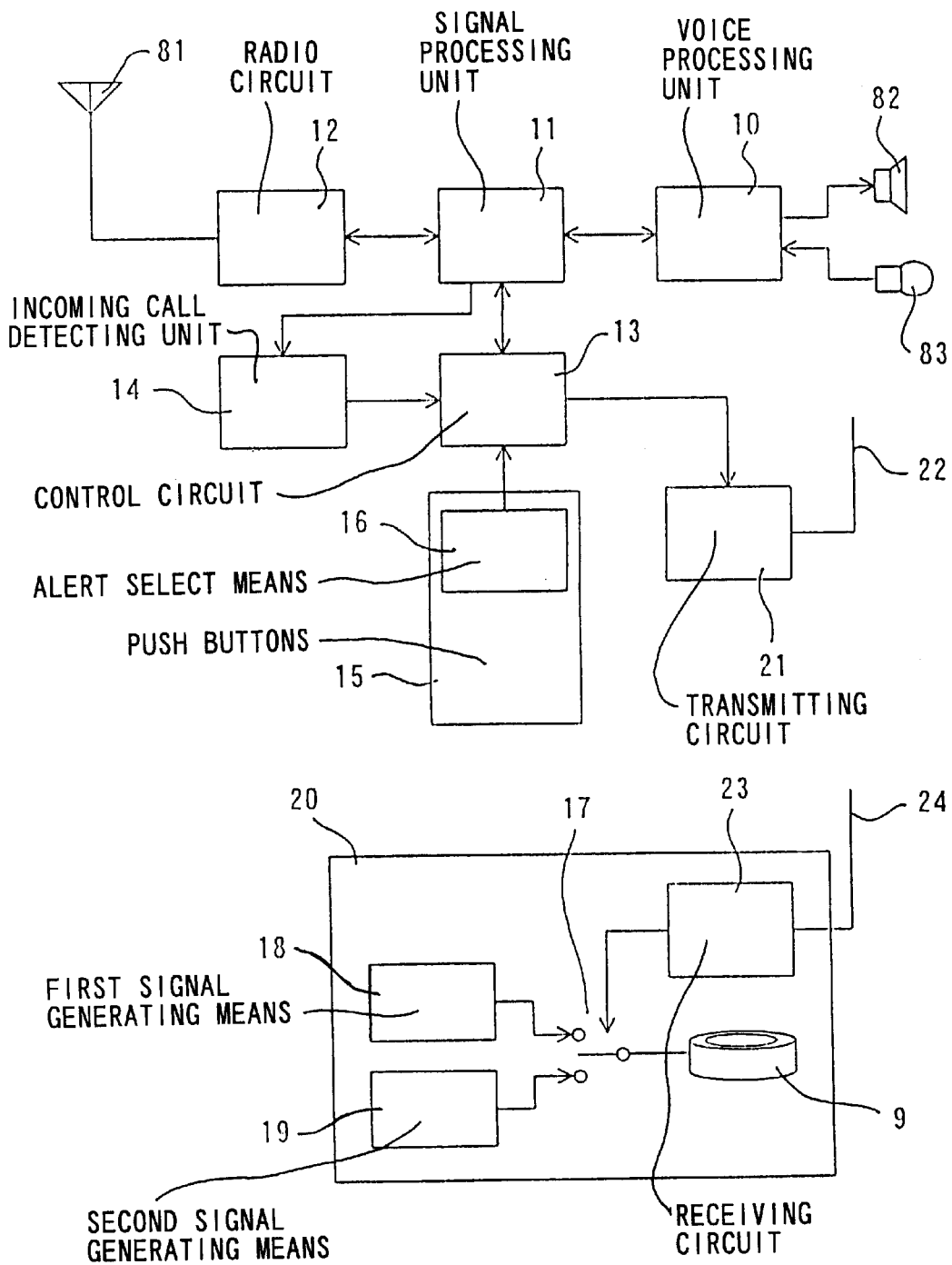
FIG. 8 is a block diagram of the second embodiment shown in FIG. 7.
Figure 9A:
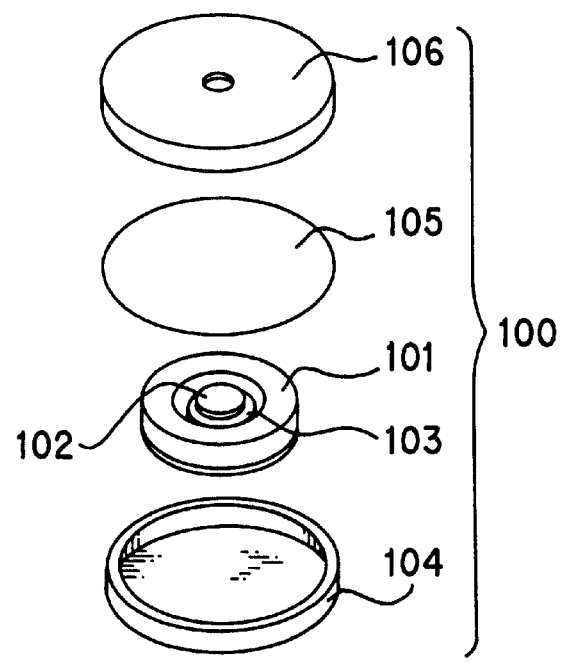
FIGS. 9(a) and 9(b) are exploded and sectional views, respectively, showing a ringer of the prior art.
Figure 9B:
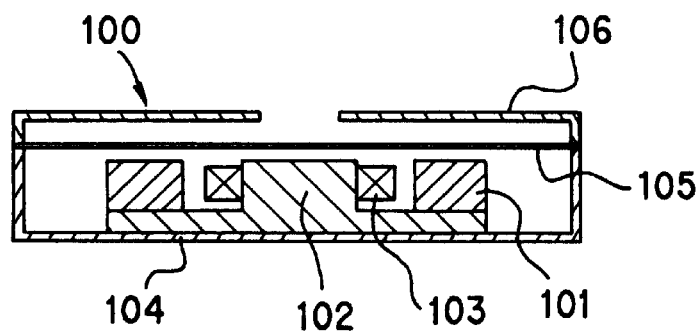
Figure 10:
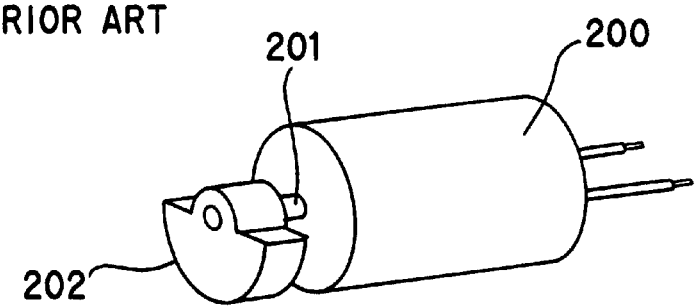
FIG. 10 is a view showing a cylindrical dc vibration motor of the prior art.
Figure 11:
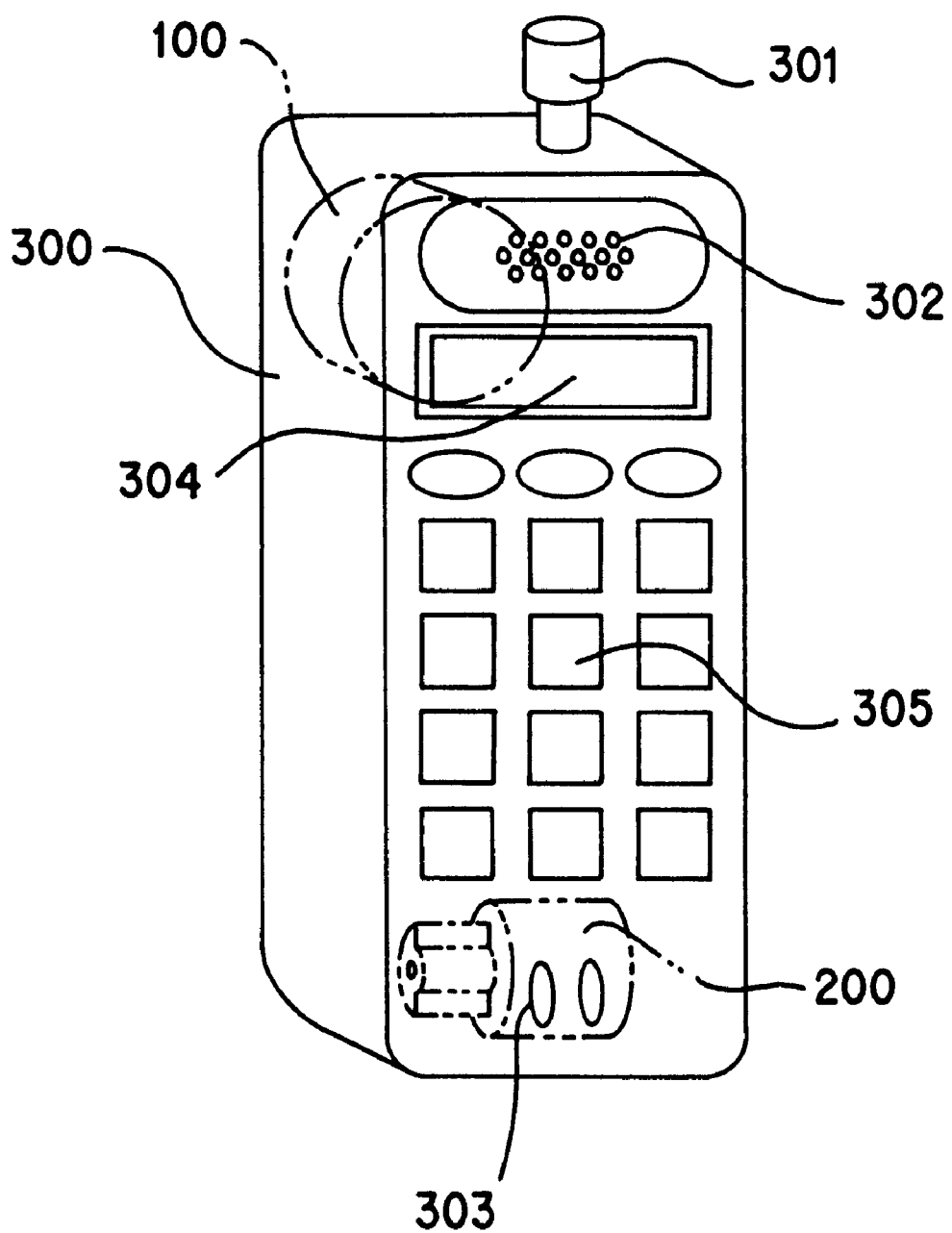
FIG. 11 is a diagram showing a conventional portable communications device.

FIGS. 7 and 8 show another embodiment of the invention. With this embodiment, a compact vibration pager 20 incorporating the vibration generator 9 is provided separately from the body 8 of a portable telephone. FIG. 9 is a block diagram showing the second embodiment. In this drawing and FIG. 5 showing the first embodiment, like parts are designated by like reference numerals and will not be described repeatedly. When an incoming call is detected by the detecting circuit 14, a transmitting circuit 21 sends a call notifying signal and a signal indicating the selection by the alert select means 16 to the pager 20 via a built-in antenna 22 under the control of the control circuit 13. The pager 20 receives the call notifying signal from the telephone body 8 by a receiving circuit 23 via a built-in antenna 24, whereupon switch means 17 is controlled to feed the signal of the first or second signal generating means 18 or 19 as selected by the user to the notifying vibration generator 9. Consequently, the pager 20 notifies the user of the incoming call with vibration or sound as selected by the user. According to the second embodiment, the pager can be thus provided separately from the portable telephone body, permitting the user to carry the pager with ease for more reliable notification of incoming calls.

The notifying vibration generator of the present invention thus comprises a single electromagnetically drivable component for causing two vibration systems to undergo forced vibration, which enables one of the vibration systems to serve the function of producing sound as a sound source and the other vibration system to perform the function of vibrating a device as a vibration source, consequently providing a notifying device of reduced size and lower cost.

A change-over circuit makes it possible for one of the vibration systems to produce a resonance phenomenon to solely produce sound or vibration. The change-over circuit therefore provides the function of producing sound or the function of vibrating the device.

Further when applied to a portable communications device, the notifying vibration generator of the invention renders the communications device compact, also making it possible to notifying the user of incoming calls reliably.

What is claimed is:

1. A notifying vibration generator characterized in that the generator comprises a first vibrator having a permanent magnet and supported by a first spring body on a first fixing member, and a second vibrator having a coil so disposed as to intersect the magnetic flux of the permanent magnet and supported by a second spring body on a second fixing member, the first spring body being in the form of a disc having spiraling slits extending from its periphery toward its center portion, the first vibrator comprising a yoke mounted on one of the magnetic poles of the permanent magnet and positioned radially inside of the coil of the second vibrator, and another yoke mounted on the other magnetic pole of the permanent magnet of the first vibrator and surrounding an outside of the coil, said another yoke having a first segment defining a vertical wall portion substantially coextensive with the height of the coil of the second vibrator to increase mass of said another yoke and a second segment of less height than said first segment extending radially from said first segment to be fitted to said permanent magnet.

the first vibrator and the first spring body serving as a vibration source for transmitting vibration to the fixing member, and the second vibrator and the second spring body serving as a sound source for producing sound waves of audio-frequency for propagation to outside.

2. A notifying vibration generator according to claim 1 which comprises a change-over circuit for changing the frequency of current to be passed through the coil to a frequency approximately in match with the natural frequency f01 of the first vibration system or to a frequency approximately in match with the natural frequency f02 of the second vibration system.

3. A notifying vibration generator according to claim 1 which is characterized in that the first vibrator for use in the vibration source vibrates in a direction perpendicular to the plane of the disc of the first spring body and transmits vibration to the fixing member by collision.

4. A notifying vibration generator according to claim 3, including cushions disposed on said yokes to dampen collisions between the first vibrator and points of collision on said fixing member and within a direction of vibration of the first spring body.

5. The notifying vibration generator according to claim 1 in which said another yoke has a cross-section of L-shape.

* * * * *